UNITED STATES PATENT OFFICE.

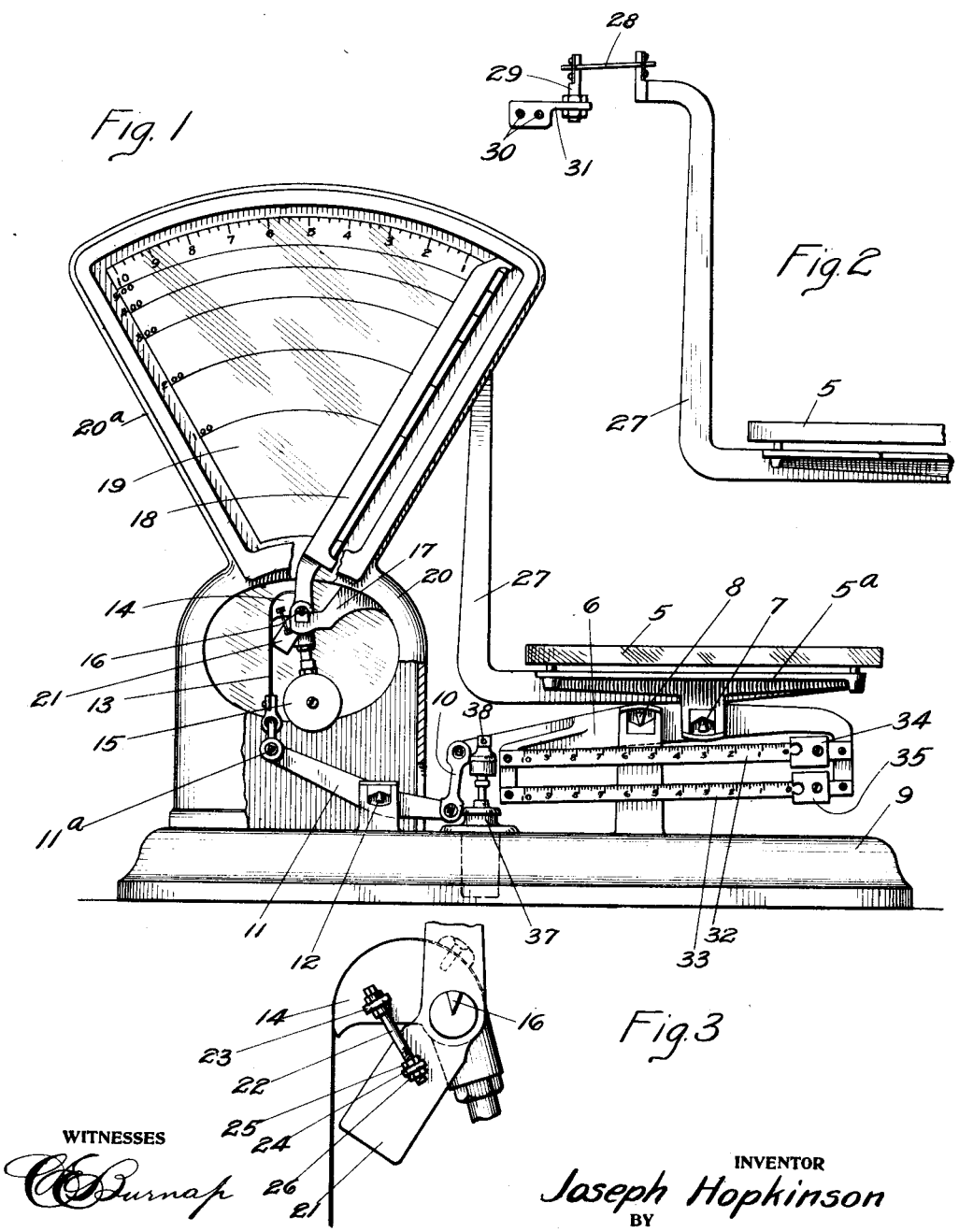

JOSEPH HOPKINSON, OF DAYTON, OHIO, ASSIGNOR TO THE COMPUTING SCALE COMPANY, OF DAYTON, OHIO, A CORPORATION OF OHIO.

COMPUTING-SCALE.

1,140,824.      Specification of Letters Patent.      Patented May 25, 1915.

Application filed October 18, 1913. Serial No. 796,019.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

My invention relates to computing scales, and has for its object the improvement of the mechanism of said scales wherein their accuracy and general efficiency are greatly increased.

Another object is to produce a scale in which the general form of the scale is very compact and convenient.

Another object is to so dispose the levers that the pressure upon certain parts is reduced to a minimum.

These and other objects will be made apparent in the following specification when taken in connection with the accompanying drawings, in which, Figure 1 is a side elevation of the scale with portions broken away to show the interior thereof. Fig. 2 is a detail of the high check. Fig. 3 is a detail of the hub portion of the pendulum.

My invention comprises the platform or commodity supporting element 5 which is preferably a flat plate of glass or other suitable material mounted upon a metallic supporting spider or frame 5$^a$. The spider 5$^a$ rests upon a lever 6 which is in turn supported by a fulcrum rigidly attached to or integral with the base 9. Knife edge bearings 7 and 8 are provided at the pivotal connections of said parts. The end of the lever 6, opposite to the point of support of the platform is connected with a lever 11 by a link 10. The lever 11 is provided with a fulcrum 12 attached to or integral with the base 9. The pressure upon said fulcrum is upward when a commodity is supported by the platform 5.

The long arm of the lever 11 is attached at its end by knife edge bearings 11$^a$ to the lower extremity of the flexible member or metal tape 13. The upper end of this tape is attached to a hub 14 of the pendulum 15 and is adapted to rest upon the curved surface of said hub. The curved surface of said hub that receives the tape has radii of variable lengths with respect to the pivot of the pendulum, said pivot being represented by the knife edge bearing 16. This knife edge bearing is supported by an inwardly projecting arm, or arms 17, rigid with the casing 20. The variable radius of the hub 14 is so proportioned with respect to the effective weight arm of the pendulum 15, that equal increments of the load upon the platform 5 will produce corresponding equal angular movements of the pendulum 15 about the pivot 16. The indicating arm 18 rigid with said pendulum sweeps across a computing chart 19 and indicates the said movements. The well known revolving cylinder may be used in connection with the pendulum 15 and be operated thereby as an equivalent of the arm 18.

The arm 18 may be counter-balanced by the weight 21 which has a position opposite to the arm, thereby making said arm sensitive to the forces acting in the weighing mechanism. The chart 19 may be inclosed in the upwardly projecting portion 20$^a$ of the casing 20.

The hub 14 is adjustable in its angular relation to the arm 18 with respect to the pivot 16. The adjustment of said hub is effected by the tangent adjusting screw 22 which is rotatably but not longitudinally mounted in a lug 23 on said hub. The opposite end of said adjusting screw passes through a lug 24 on the weighted portion 21 of the arm 18 and is locked in position by the nuts 25 and 26 on opposite sides of said lug.

The spider 5$^a$ of the commodity supporting element is provided with an upwardly projecting arm 27 which is movably attached to the upper portion of the casing by the link 28. The link 28 is pivotally attached by suitable knife edge bearings at one end to the upper extremity of the arm 27 and at the other end to a post 29 secured to the upper part of the casing 20$^a$ by a bracket 31 held by suitable screws or rivets 30. The link 28 has a position substantially parallel to a line extending from knife edge bearing 7 to the knife edge bearing 8 and is substantially the same in length as said distance. By this means I provide a mechanism capable of a parallel movement of the commodity supporting element and this in connection with the elevated position of said check causes said element to be very accurate in its operation and to be free of vibration.

I have provided the auxiliary scale bars 32 and 33 which are secured to the lever 6 and provided with the auxiliary weights 34 and 35. I have also provided a dash-pot 37, which is pivotally connected with the lever 6 at 38 and which is adapted to prevent undue vibration of the scale mechanism.

In the use and operation of my improved scale, it will be seen that when a commodity is placed upon the platform 5 the pressure upon the lever 6, at the knife edge bearing 7, will cause said lever to move about its fulcrum 8 and the left hand end of the lever will rise. The upward pull upon the link 10 is transmitted to the intermediate lever 11, causing an upward pressure upon the fulcrum 12. The downward movement of the left hand end of the lever 11 will cause a downward pull upon the tape 13 which in turn will pull downwardly upon the hub 14. As the downward movement continues the tape will act upon portions of the surface of said hub which have shorter radii and hence will require additional weight on the platform to effect further movement. The movement of the pendulum 15 to the right from its normal position causes its effective weight arm to increase and for this reason also a further weight upon the platform 5 is necessary to effect further movements.

The variable radius of the hub 14 is so proportioned with respect to the variable effective weight arm of the pendulum 15 that the combined effect of said variable radius and said variable weight arm is to cause equal increments of load upon the platform 5 to produce equal increments of movement of the indicating arm 18 from its normal or zero position. It will be understood that the effective weight arm of the pendulum is the horizontal distance from its center of gravity to the vertical line passing through the knife edge pivot 16 and that the effective radius of the tape 13 is the perpendicular distance from the unrolled part of said tape to said knife edge pivot.

While I have described my invention more or less precisely as regards the details of construction, I do not wish to be limited thereto unduly for the reason that I contemplate changes in the form and proportion of the parts and the substitution of equivalent as circumstances suggest or render expedient without departing from the spirit of my invention.

What I claim is:—

1. In a device of the class described, two levers positioned substantially horizontally and end to end, a link connecting their adjacent ends, intermediate fixed fulcrums for the levers, a platform pivotally supported on the end of one lever, a counterbalancing pendulum above the opposite end of the other lever, and operatively connected thereto, an indicator above said pendulum, a housing for said pendulum and indicator, an arm rigidly connected with said platform and extending thence upwardly directly above said link to a point adjacent to the upper part of said housing, and a link connecting the upper end of said arm to a fixed point of said housing.

2. In a device of the class described, two levers positioned substantially horizontally and end to end, a link connecting their adjacent ends, intermediate fixed fulcrums for the levers, a platform pivotally supported on the end of one lever, a counterbalancing pendulum above the opposite end of the other lever and operatively connected thereto, an indicator above said pendulum, an arm rigidly connected with said platform and extending thence upwardly directly above said link to a point above the lever connected with the pendulum, and a link connected at one end with the upper end of said arm and at the other end to a fixed point.

3. In a device of the class described, two levers positioned substantially horizontally and end to end, a link connecting their adjacent ends, intermediate fixed fulcrums for the levers, a platform over one lever and pivotally supported on the end thereof, a counterbalancing pendulum above the opposite end of the other lever and operatively connected thereto, indicating means above said pendulum, and a housing for said means and pendulum and adjacent lever, said housing having a hole in its side through which the end of the lever projects for connection with said link.

4. In a device of the class described, two levers positioned substantially horizontally and end to end, a link connecting their adjacent ends, intermediate fixed fulcrums for the levers, a platform over one lever and pivotally supported on the end thereof, a counterbalancing pendulum above the opposite end of the other lever and operatively connected thereto, indicating means above said pendulum, an arm rigidly connected with said platform and extending thence upwardly directly above said link to a point adjacent to the upper part of said housing, and a link connecting the upper end of said arm to a fixed point of said housing.

5. In a device of the class described, two levers positioned substantially horizontally and end to end, a link connecting their adjacent ends, intermediate fixed fulcrums for the levers, a platform over one lever and pivotally supported on the end thereof, a counterbalancing pendulum above the opposite end of the other lever and operatively connected thereto, indicating means above said pendulum, an arm rigidly connected with said platform and extending thence upwardly directly above said link, and a link connecting the upper end of said arm to a fixed point.

In testimony whereof, I have subscribed my name.

JOSEPH HOPKINSON.

Witnesses:
A. S. HENDRICKS,
H. A. LEONARD.